US012717795B2

(12) United States Patent
Alves et al.

(10) Patent No.: US 12,717,795 B2
(45) Date of Patent: Aug. 25, 2026

(54) SCALABLE INTERNATIONALIZATION IN DATABASE SEARCH

(71) Applicant: SAP SE, Walldorf (DE)

(72) Inventors: Jovani Mattiello Alves, Ivoti (BR); Eric Fernandes Monteiro, Novo Hamburgo (BR); Micael Flores Ramos, Morro Reuter (BR); Marcus Vinicius Fleck, Campo Bom (BR); Jonathan Paul Driemeyer Brown, Porto Alegre (BR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/968,266

(22) Filed: Dec. 4, 2024

(65) Prior Publication Data

US 2026/0154275 A1 Jun. 4, 2026

(51) Int. Cl.

| | |
|---|---|
| ***G06F 16/24*** | (2019.01) |
| ***G06F 9/50*** | (2006.01) |
| ***G06F 16/2455*** | (2019.01) |
| ***G06F 16/2457*** | (2019.01) |
| ***G06F 16/25*** | (2019.01) |

(52) U.S. Cl.

CPC ...... *G06F 16/24575* (2019.01); *G06F 9/5077* (2013.01); *G06F 16/24552* (2019.01); *G06F 16/256* (2019.01)

(58) Field of Classification Search

None

See application file for complete search history.

(56) References Cited

U.S. PATENT DOCUMENTS

| | | | | |
|---|---|---|---|---|
| 9,430,571 | B1 | 8/2016 | Carter et al. | |
| 10,276,170 | B2 | 4/2019 | Gruber et al. | |
| 10,791,176 | B2 | 9/2020 | Phipps et al. | |
| 11,086,869 | B1 * | 8/2021 | Aleti | G06F 16/2453 |
| 11,157,498 | B1 * | 10/2021 | James | G06F 9/542 |
| 11,238,049 | B1 * | 2/2022 | James | G06F 40/30 |
| 11,275,733 | B1 * | 3/2022 | Batsakis | G06F 16/137 |

(Continued)

OTHER PUBLICATIONS

U.S. Appl. No. 18/425,883, filed Jan. 29, 2024, Ramos.

(Continued)

*Primary Examiner* — Eliyah S. Harper

(74) *Attorney, Agent, or Firm* — Fish & Richardson P.C.

(57) ABSTRACT

This disclosure describes systems, software, and computer implemented methods for generating a flexibly scalable database with native internationalization. This can include partitioning a dataset into a group of subsets based on one or more attributes; initiating a plurality of in-memory database instances in a containerized computing environment, wherein there is at least one in-memory database instance in the plurality of in-memory database instances for each database subset of the group of subsets; loading, by a particular in-memory database instance, a particular database subset; receiving a query at a database gateway from an application layer, wherein the query identifies a particular attribute of data to be queried; identifying, by the database gateway, the particular database subset; directing, by the database gateway, the query to the particular in-memory database instance, and receiving a result; and returning the result to the application layer.

20 Claims, 5 Drawing Sheets

(56) References Cited

U.S. PATENT DOCUMENTS

| | | | |
|---|---|---|---|
| 11,405,466 B2 | 8/2022 | Phipps et al. | |
| 11,573,971 B1 * | 2/2023 | Cannon | G06F 16/252 |
| 11,593,477 B1 * | 2/2023 | Thimmegowda | G06F 21/552 |
| 11,715,051 B1 * | 8/2023 | Baskaran | G06N 5/04 707/758 |
| 11,843,622 B1 * | 12/2023 | Tellez | H04L 63/1425 |
| 11,892,996 B1 * | 2/2024 | Anwar | G06F 16/2379 |
| 11,902,306 B1 * | 2/2024 | Satish | H04L 63/1425 |
| 11,916,929 B1 * | 2/2024 | Thimmegowda | H04L 63/1425 |
| 12,045,201 B1 * | 7/2024 | Satish | G06F 16/283 |
| 12,087,308 B2 | 9/2024 | Gruber et al. | |
| 2009/0012824 A1 | 1/2009 | Brockway et al. | |
| 2013/0275164 A1 | 10/2013 | Gruber et al. | |
| 2013/0344896 A1 * | 12/2013 | Kirmse | G06F 16/9537 455/456.3 |
| 2018/0260742 A1 | 9/2018 | Li | |
| 2020/0143495 A1 | 5/2020 | Hewitt et al. | |
| 2021/0133847 A1 | 5/2021 | Mezaael | |
| 2024/0320231 A1 * | 9/2024 | Bhattacharjee | G06F 9/5066 |

OTHER PUBLICATIONS

Concur.com [online], “Buckle in, tray tables up: Concur Travel’s biggest update in years is about to take off” Sep. 11, 2023, retrieved on Jan. 29, 2024, retrieved from URL <https://www.concur.com/blog/article/buckle-in-tray-tables-up-concur-travels-biggest-update-in-years-is-about-to-take-off>, 7 pages.

Non-Final Office Action in U.S. Appl. No. 18/425,883, mailed on Sep. 27, 2024, 23 pages.

SAP Concur [online], “Concur Travel: The New Travel Experience” Aug. 14, 2023, retrieved on Jan. 29, 2024, <https://www.youtube.com/watch?v=bWii9LiNlaU>, 1 page [Video Submission].

* cited by examiner

SCALABLE INTERNATIONALIZATION IN DATABASE SEARCH

BACKGROUND

Some data repositories contain vast amounts of data sets that are repeated across multiple language or multiple formats. Database and repository scaling is the process of adjusting a database's capacity to handle growing amounts of data and user requests. When providing additional access to scale such databases, currently solutions duplicate the entire database, or otherwise provide resources, whether hardware or software, that apply to the entirety of the database or repository.

SUMMARY

The present disclosure involves systems, software, and computer implemented methods for generating a flexibly scalable database with native internationalization. This can include partitioning a dataset into a group of subsets based on one or more attributes; initiating a plurality of in-memory database instances in a containerized computing environment, wherein there is at least one in-memory database instance in the plurality of in-memory database instances for each database subset of the group of subsets; loading, by a particular in-memory database instance, a particular database subset; receiving a query at a database gateway from an application layer, wherein the query identifies a particular attribute of data to be queried; identifying, by the database gateway, the particular database subset; directing, by the database gateway, the query to the particular in-memory database instance, and receiving a result; and returning the result to the application layer.

Implementations can optionally include one or more of the following features.

In some instances, the database gateway identifies the particular database subset based on at least one of: a URL from which the query was received, or the particular attribute identified within the query.

In some instances, the one or more attributes comprise a language of the database subset.

In some instances, the database gateway receives the query from the application layer and returns the result to the application layer using an API.

In some instances, operations further include identifying an increased demand for the particular database subset; and instantiating at least one additional in-memory database instance to load the particular database subset.

In some instances, wherein the plurality of in-memory database instances are loaded with the group of subsets of the dataset such that the entire dataset is loaded in in-memory database instances. In some instances, the plurality of in-memory database instances are allocated among the group of subsets according to an expected service demand.

The details of these and other aspects and embodiments of the present disclosure are set forth in the accompanying drawings and the description below. Other features, objects, and advantages of the disclosure will be apparent from the description, drawings, and claims.

DESCRIPTION OF DRAWINGS

Some example embodiments of the present disclosure are illustrated by way of example and not limitation in the figures of the accompanying drawings, in which like reference numbers indicate similar elements.

DETAILED DESCRIPTION

Figure 1:
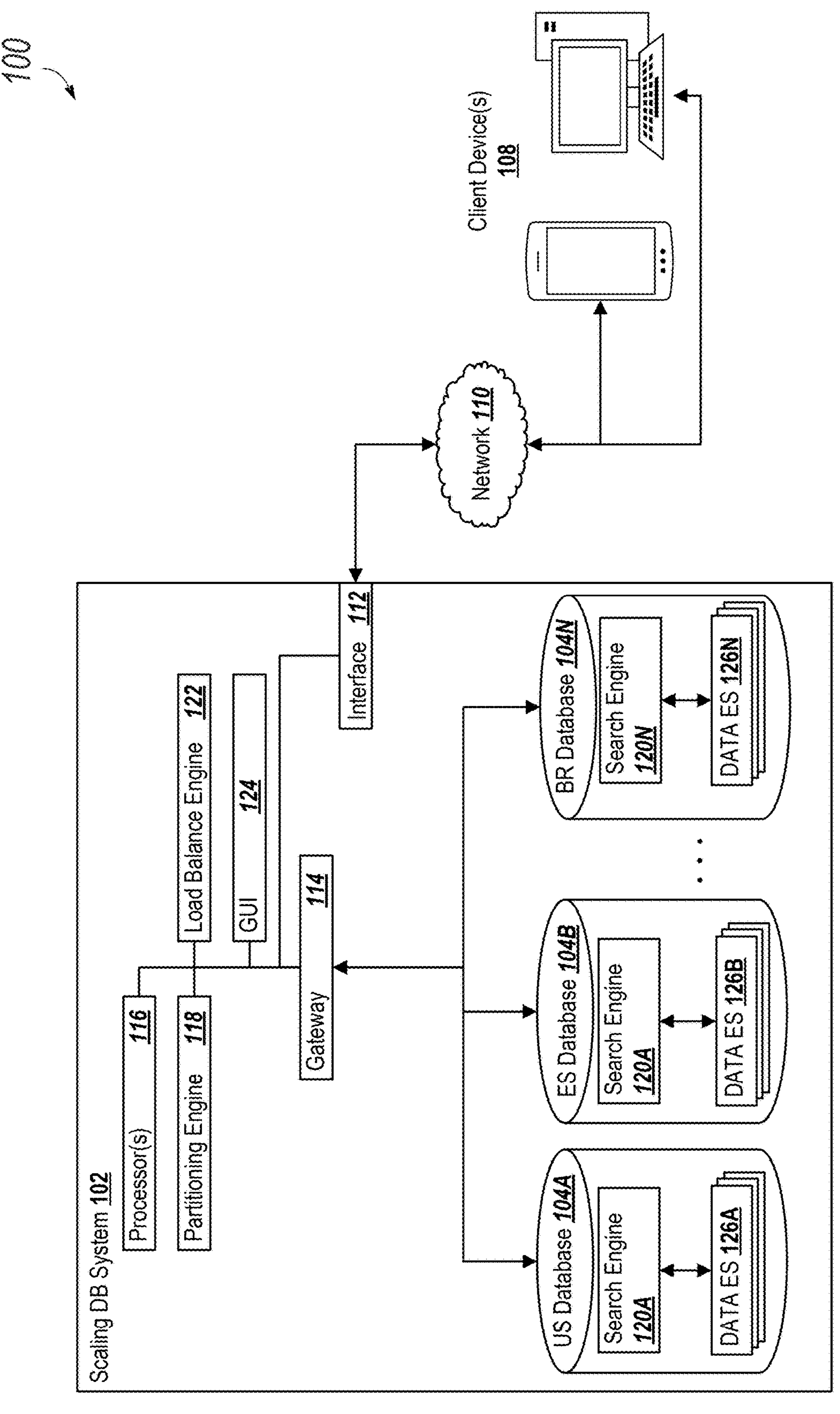
FIG. 1 illustrates a schematic diagram of a system for operation of a flexibly scalable database with native internationalization.

This disclosure describes methods, software, and systems for generating and operating a flexibly scalable database with native internationalization. Many cloud-based and information-based database systems use master data, which can play a crucial role. Master data is often characterized by its stability; that is, it changes only infrequently, but remains vital to the operation of cloud solutions. In scenarios where a cloud solution with millions of simultaneous users requires quick access to master data with high availability, this disclosure presents an innovative solution related to database systems for providing high horizontal scalability. Specifically, the solution is a NoSQL, read-only, distributed in-memory database system which, in some instances, can be implemented using the Go programming language. This NoSQL architecture supports high horizontal scalability and offers high-speed data access. The disclosed solution can be designed and optimized for read-only operations and, in some implementations, leverages Go's inherent performance advantages, including efficient memory management, lightweight threading, and native support for concurrent data processing. This technology focuses on high-speed data retrieval and ensuring availability, supplying to the needs of industries that rely heavily on these characteristics.

The disclosed solution, which can be referred to as the "OmniDB database system" includes an interface layer, a search engine layer, and a data storage layer.

1. Interface Layer: The interface layer facilitates communication with the outside world, for example, using RESTful APIs. This layer is designed to be simple, supporting filtering, query searching, and geo-spatial document searches.
2. Search Engine Layer: The search engine layer can employ Go's inherent concurrency features for performing data retrieval operations on the database. These operations are further optimized by leveraging in-memory storage, allowing for faster data access.
3. Data Storage Layer: The data storage layer can utilize Go's efficient memory management system to store data directly in memory, rather than disk-based storage, thus enhancing data access speed significantly. Non-volatile data is safely stored in a cloud storage and loaded on the database system startup.

One innovation of the present solution is its ability to serve non-structured data from cloud storages via an API such as RESTful API, which transforms any cloud storage into a high-speed database, reducing the complexity and latency associated with data retrieval. When the OmniDB starts, it initiates real-time data fetching from any chosen cloud storage providers, such as AWS S3. Whether the format is JSON, XML, or another suitable option, OmniDB adapts the data to ensure integration. This fetched data undergoes an on-the-fly conversion process, made to fit into a chosen structure optimized for rapid access. The result is a database service environment optimized for speed and efficiency.

Additionally, the solution includes native support for internationalization. Each language can have an exclusive OmniDB instance-therefore, each language can be scaled independently of the other languages. This feature reduces memory usage and cloud costs by scaling according to the language's usage. This differs from conventional applications that make use of tables for each language, thereby eliminating the need to create a new database instance with an entire data set duplicated. In addition to internationalization, native support for other differentiations is further considered. For example, product differences by region, databases of localities such as restaurants, hotels, entertainment services, etc., and other objects can be readily partitioned and scaled independently based on the region in which they provide service.

Turning to the illustrated example implementations, FIG. 1 illustrates a schematic diagram of a system 100 for operation of a flexibly scalable database with native internationalization. The system 100 includes the scaling database system 102, a set of database instances 104A-104N, and at least one client device 108, where the client device(s) 108 can communicate with the scaling database system 102 using network 110.

As illustrated, the scaling database system 102 includes an interface 112, gateway 114, user interface 124, load balancing engine 122, search engines 120A-120N, partitioning engine 118, one or more processors 116. In some implementations, the scaling database system operates as a cloud-based service. Further, different portions of the scaling database system 102 can be distributed or otherwise in separate locations, on separate networks, or on separate hardware systems. In some implementations, for example, each database 104 is physically located in the region it is configured to service.

Interface 112 is used by the scaling database system 102 to communicate with other systems in a distributed environment-including within the system 100-*connected* to the network 110 (e.g., client 108, and other systems communicably coupled to the illustrated scaling database system 102 and/or network 110. Generally, the interface 112 comprises logic encoded in software and/or hardware in a suitable combination and operable to communicate with the network 110 and other components. More specifically, the interface 112 can comprise software supporting one or more communication protocols associated with communications such that the network 110 and/or interface's 112 hardware is operable to communicate physical signals within and outside of the illustrated system 100. Still further, the interface 112 can allow the computing system 102 to communicate with the client 108, and in some implementations, in-memory databases 104A-104N, and/or other portions illustrated within the system 100 to perform the operations described herein.

Client devices 108 are computing devices or computers used by one or more users to interact with the scaling database system 102. In some cases, system 100 describes an enterprise computing environment, where the user consumes database objects (e.g., DATA 126A-N). As used in the present disclosure, the term "computer" or "computing devices" is intended to encompass any suitable processing device. For example, the client devices 108 can be any computer or processing device such as, for example, a blade server, general-purpose personal computer (PC), Mac® workstation, UNIX-based workstation, or any other suitable device. In other words, the present disclosure contemplates computers other than general-purpose computers, as well as computers without conventional operating systems. Similarly, the client devices 108 can be any system that can request data and/or interact with the scaling database system 102. The client devices 108, in some instances, can be a desktop system, a client terminal, or any other suitable device, including a mobile device, such as a smartphone, tablet, smartwatch, or any other mobile computing device. In general, each illustrated component can be adapted to execute any suitable operating system, including Linux, UNIX, Windows, Mac OS®, Java™, Android™ Windows Phone OS, or iOST, among others. The client devices 108 can include one or more specific applications executing on the client devices 108, or the client devices 108 can include one or more Web browsers or web applications that can interact with particular applications executing remotely from the client devices 108.

GUI 124 of the scaling database system 102 interfaces with at least a portion of the system 100 for any suitable purpose, including generating a visual representation of any particular application or results and/or the content associated with any components of the client devices 108. In particular, the GUI 124 can be used to present results of a query or allow the user to input queries to the scaling database system 102, as well as to otherwise interact and present information associated with one or more applications. GUI 124 can also be used to view and interact with various web pages, applications, and web services located local or external to the scaling database system 102. Generally, the GUI 124 provides the user with an efficient and user-friendly presentation of data provided by or communicated within the system. The GUI 124 can comprise a plurality of customizable frames or views having interactive fields, pull-down lists, and buttons operated by the user. In general, the GUI 124 is often configurable, supports a combination of tables and graphs (bar, line, pie, status dials, etc.), and is able to build real time portals, application windows, and presentations. Therefore, the GUI 124 contemplates any suitable graphical user interface, such as a combination of a generic web browser, a web-enable application, intelligent engine, and command line interface (CLI) that processes information in the platform and efficiently presents the results to the user visually.

Network 110 facilitates wireless or wireline communications between the components of the system 100 (e.g., between the scaling database system 102, the client devices 108, etc.), as well as with any other local or remote computers, such as additional mobile devices, clients, servers, or other devices communicably coupled to network 110, including those not illustrated in FIG. 1. In the illustrated environment, the network 110 is depicted as a single network, but can comprise more than one network without departing from the scope of this disclosure, so long as at least a portion of the network 110 can facilitate communications between senders and recipients. In some instances, one or more of the illustrated components (e.g., the load balancing engine 122, the partitioning engine 118, etc.) can be included within or deployed to network 110 or a portion thereof as one or more cloud-based services or operations. The network 110 can be all or a portion of an enterprise or secured network, while in another instance, at least a portion of the network 110 can represent a connection to the Internet. In some instances, a portion of the network 110 can be a virtual private network (VPN). Further, all or a portion of the network 110 can comprise either a wireline or wireless link. Example wireless links can include 802.11a/b/g/n/ac, 802.20, WiMax, LTE, and/or any other appropriate wireless link. In other words, the network 110 encompasses any internal or external network, networks, sub-network, or combination thereof operable to facilitate communications between various computing components inside and outside the illustrated system 100. The network 110 can communicate, for example, Internet Protocol (IP) packets, Frame Relay frames, Asynchronous Transfer Mode (ATM) cells, voice, video, data, and other suitable information between network addresses. The network 110 can also include one or more local area networks (LANs), radio access networks (RANs), metropolitan area networks (MANs), wide area networks (WANs), all or a portion of the Internet, and/or any other communication system or systems at one or more locations.

Although illustrated as a single processor 116 in FIG. 1, multiple processors can be used according to particular needs, desires, or particular implementations of the system 100. Each processor 116 can be a central processing unit (CPU), an application specific integrated circuit (ASIC), a field-programmable gate array (FPGA), or another suitable component. Generally, the processor 116 executes instructions and manipulates data to perform the operations of the scaling database system 102. Specifically, the processor 116 executes the algorithms and operations described in the illustrated figures, as well as the various software modules and functionality, including the functionality for sending communications to and receiving transmissions from client devices 108, as well as to other devices and systems. Each processor 116 can have a single or multiple core, with each core available to host and execute an individual processing thread. Further, the number of, types of, and particular processors 116 used to execute the operations described herein can be dynamically determined based on a number of requests, interactions, and operations associated with the scaling database system 102.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component can be fully or partially written or described in any appropriate computer language including C, C++, JavaScript, Java™, Visual Basic, assembler, Perl®, any suitable version of 4GL, as well as others.

The partitioning engine 118 can be a software or firmware application that analyzes data sets and determines how to partition them for storage within the in-memory database 104A-N. For example, a conventional database may have a large quantity of data that is duplicated across multiple languages. The partitioning engine 118 can partition the data into smaller data sets based on language. Additionally, or alternatively, partitions can be made, for example, based on the data type or category. For example, the "English" data set can be partitioned into "ground transportation," "lodging," and "air travel" partitions. In some implementations, the partitioning engine 118 partitions data sets to ensure they are below a predetermined size to improve response time or fetch time from the in-memory databases where the partitions will be stored. In some implementations, partitioning engine 118 re-analyzes the datasets periodically or when a change in the full database size (e.g., cumulative size of all datasets) exceeds a predetermined threshold. Once the data to be stored is partitioned, the individual partitions can be loaded in the applicable in-memory database 104A-N. For example, DATA US 126A, which can be English language data, is loaded into the US database 104A, DATA ES 126B can be loaded into the Spanish database 104B and include Spanish language data, etc. In some implementations, the US database 104A can be geographically located within the US, or in a location that provides rapid access to US-based users. Similarly, the Brazilian database 104N, which can be configured to provide rapid access to Brazilian or other Portuguese speaking users, can load the Portuguese language data, DATA PT 126N, which is what will be queries most frequently in Brazil.

The load balancing engine 122 can monitor each in-memory database 104A-N's relative load, response time, throughput, and/or network traffic, and identify databases that are not able to satisfy their associated demand, as well as databases that are underloaded or underutilized. That is, if there are multiple databases servicing the same datasets where fewer or a single database could readily satisfy the entire demand, the load balancing engine 122 can reallocate those databases accordingly. In some instances, the load balancing engine 122 can be implemented as part of the structure or system on which the scaling database system 102 is installed. For example, the scaling database system 102 can execute in a Kubernetes environment, which natively provides load balancing functionality.

Each database 104A-104N can be an in-memory database, such as those provided by SAP HANA, where a computer memory is used instead of disk storage to store its data. An advantage of in-memory databases is that they can perform many operations (e.g., reading and writing) much faster (e.g., 10-1000 times faster) than conventional disk storage databases. However, because there is often a higher operating cost associated with in-memory data storage, it is desirable to minimize the amount of redundantly stored data, and the total data storage amount, in general. Another advantage of in-memory data storage is that they can allow more flexible data storage formats. For example, SAP HANA can support unstructured data storage, including NoSQL databases. This provides increased flexibility and efficiency as compared to conventional relational databases.

The load balancing engine 122 can further provide horizontal pod autoscaling functionality. For example, the load balancing engine 122 can instantiate in-memory databases 104A-N according to the partitions and the associated demand for those partitions. For example, if there are significantly more users or queries to the English data on the US database 104A as compared to the Spanish database (ES database) 104B, then the load balancing engine 122 may instantiate one or more instances of the US database 104A as compared to ES database 104B. In doing so, additional resources can be made available for the US database 104A, allowing more users and more requests to be received and responded to with reduced query time and without incurring the full operational cost of duplicated the entire database.

The gateway 114 analyzes the query and determines which in-memory database 104A-N to be searched. The gateway 114 can direct the query by reformatting it as an HTTPS request directed to the particular in-memory database 104A-N to be queried. In some implementations, the gateway 114 routes traffic between the interface 112 and the in-memory databases based on the origin of the user query. For example, the incoming HTTP request that includes the query can also include an embedded language or origin service. In those instances, the gateway can automatically select a destination in-memory database for the query based on that embedded language. A search in Spanish can be directed to the ES Database 104B, for example.

Each in-memory database 104A-N can include a search engine 120A-N. The search engines 120A-N can take a query and analyze a dataset (e.g., DATA 126A-N) for matches or "hits" in the data associated with the query. The search engine can utilize various algorithms such as select queries, joins, index matching, or other suitable search techniques. In some implementations the search engine 120 uses a natural language search, powered by one or more generative artificial intelligence models. In some implementations, the search engine 120 performs a search on the particular dataset as directed by the gateway 114 discussed above.

In some implementations, the search engines 120A-N perform additional analysis on the query or request. For example, if an additional attribute filter is included in the query, the search engines 120A-N can use that filter to select a particular in-memory database. For example, if the query is an English-based query for hotels near New York City, the search engine 120A-N may limit the search of the dataset to data with a type attribute of "hotel" and a geographic attribute indicating that it is near New York City. In another example, the query may include a preferred dataset or a specified dataset to be queried, in which case the gateway 114 can select the appropriate in-memory database.

Figure 2:
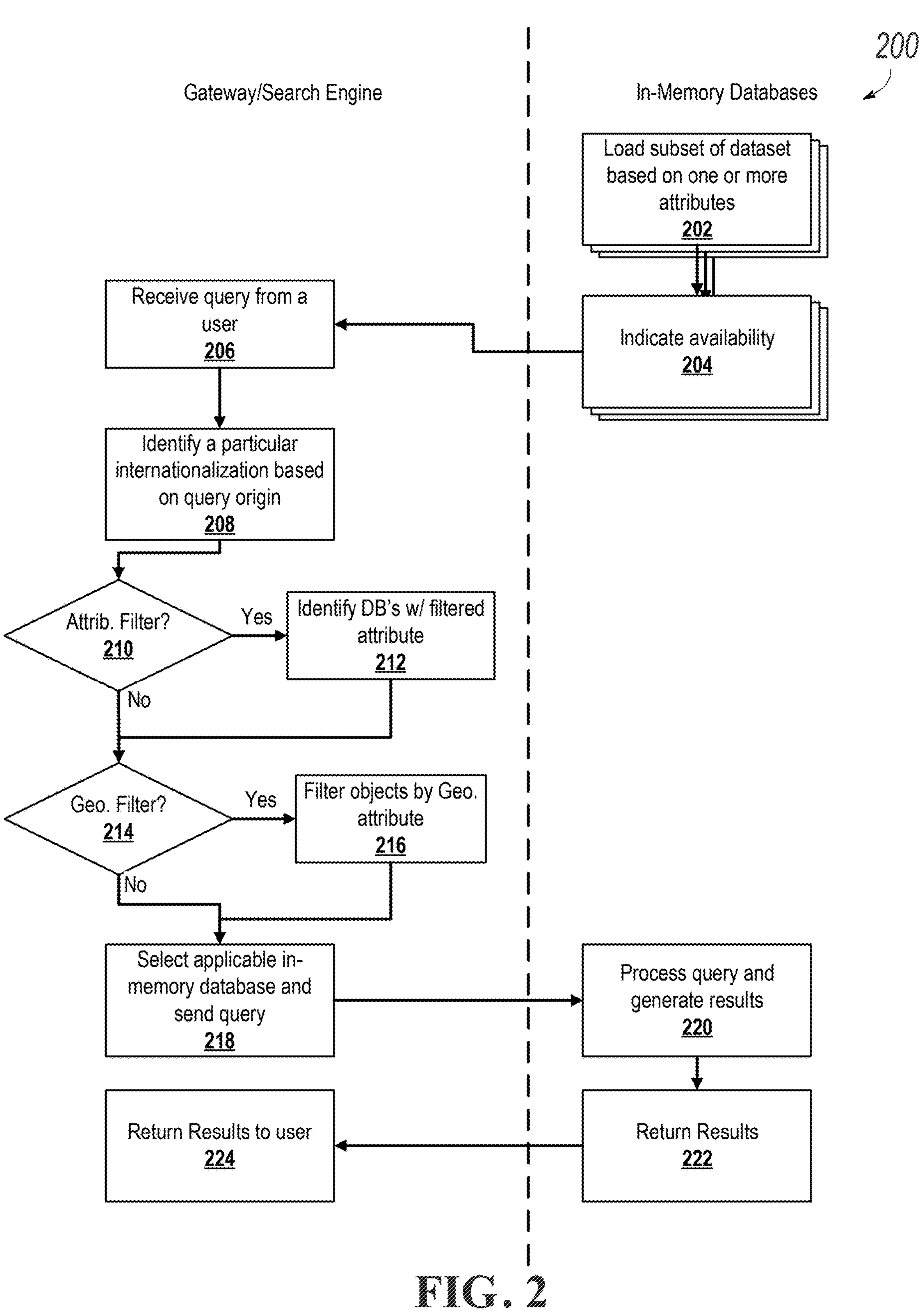
FIG. 2 is a flowchart of an example process 200 for querying a flexibly scalable database with native internationalization.

FIG. 2 is a flowchart of an example process 200 for querying a generating a flexibly scalable database with native internationalization. It will be understood that process 200 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute process 200. In some implementations, the process 200 and related methods are executed by one or more components of the system 100 described above with respect to FIG. 1, such as the gateway 114 and the search engine 120, and/or portions thereof.

At 202, a subset of dataset to be made available is loaded into each of the in-memory databases such that in the aggregate the entire dataset is loaded amongst multiple instances of the databases. In some implementations, datasets or portions of datasets can be loaded multiple times, in multiple instances of in-memory databases to provide increased bandwidth for service for additional user capacity. The subsets to be loaded can be selected based on size, language, data attributes, or other parameters. Additionally, subsets can be duplicated in additional in-memory databases to provide scaling based on expected future demand. The in-memory databases can be reallocated, new ones brought online, or shut down during operation in response to changes in user demand or operational resources. The selection of the subsets, and how many to load into an in-memory database, is described in further detail below with respect to FIG. 3.

At 204, the in-memory databases may optionally indicate to the scaling database system that they are available for query as they finish loading their assigned subsets of the data. This readiness can be indicated by an API call or a message to the gateway presenting a status and a metadata object indicating the subset that has been made available. Any other suitable indication can be provided. In other instances, queries as shown at 206 may be received before loading is complete. In those instances, handling and/or execution of the query may be delayed until the loading process is complete, or an indication of readiness for the databases are identified or indicated.

At 206, a query is received at the gateway. The query may be provided by a user (e.g., via a search or query tool), or the search may be received by an application or other automated process. In some implementations, the query is for a specific search term (e.g., a string) or a particular value. In some implementations, the query includes additional modifiers such as filters or Boolean terms. For example, a user could search for the string "restaurants" with a filter limiting the search to a particular geographic region (e.g., less than 50 miles from Dallas, TX).

At 208, the gateway identifies which language or region to which the query applies based on the location from with the query is entered. For example, if the user submits the query at the Brazilian portal, the gateway can determine that the particular subsets of the dataset to be search are the Portuguese language subsets. In some implementations, the region or language information is obtained based on data embedding in the initial HTTPS request, or the origin URL from the user or host that services the user. For example, the host service can include a "-EN" in the hosted URL to indicate that it is providing English language services. In some implementations, the user can select a preferred language or region, and the gateway can select the applicable in-memory database based on the user preferences.

At 210, a check is performed to determine whether the query included an attribute filter. If the query does not have any attribute filters, then process 200 proceeds directly to 214. Attributes can be, but are not limited to, a data type (e.g., string, float, double, etc.), a data category or name (e.g., "invoices", "LIDAR data", "measurements", etc.), or other attribute. If an attribute filter is present in the query, process 200 proceeds to 212.

At 212, the gateway identifies in-memory databases that include the specified attribute. In some implementations, the gateway instead determines which databases to exclude based on the filtered attributes. In some implementations, the in-memory databases selected here are from the previously selected applicable databases identified in 208.

At 214, the gateway determines if a geographic filter is applied. In some instances, the query can include a geographic filter which can limit the query to data associated with a particular location. If no geographic filter is applied, process 200 proceeds directly to 218. If a geographic filter is in the query, process 200 proceeds to 216.

At 216, the search engine can filter objects in the in-memory databases that are included in the specified geographic region. In some implementations, the search engine instead determines which database objects to exclude based on the geographic filter. In some implementations, this selection or filtering of objects in the in-memory databases is limited to the previously selected applicable databases from 208 and 210. It should be noted that while illustrated as sequential from 208, to 210, then 214, the in-memory database selection can occur for each filter or attribute simultaneously, or in other orders. In some implementations, portions of process 200 are combined, or occur in parallel.

At 218, the gateway selects the applicable in-memory database(s) and sends or otherwise provides the query accordingly. The query can be sent using an API, such as RESTful API using HTTPS requests where the in-memory databases are remote from the gateway.

At 220, the in-memory databases that received the query process the query and generate a list of results. In some implementations, the query is processed with a simple search or matching algorithm. In some implementations, a geosearch is performed in addition to the search or matching algorithms. In some implementations, the query is processed using natural language processing or other process such as using one or more machine learning models. The results can be returned as a list, or a table, or set of links, among other formats.

At 222, the in-memory database(s) returns the results to the gateway. In some implementations, this is performed using a separate API call. In some implementations, the return is using the initial API call that queried the database.

At 224, the gateway can return the results to the user. In some implementations, the results are returned in a GUI that provides additional functionality. In some instances, additional query refinement can be provided via the GUI, allowing the results to be further limited with additional terms, phrases, or restrictions, as well as to modify the search terms and initiate an updated search. In some instances, the GUI may provide or make available metadata information regarding the number of results and breadth of results.

Figure 3:
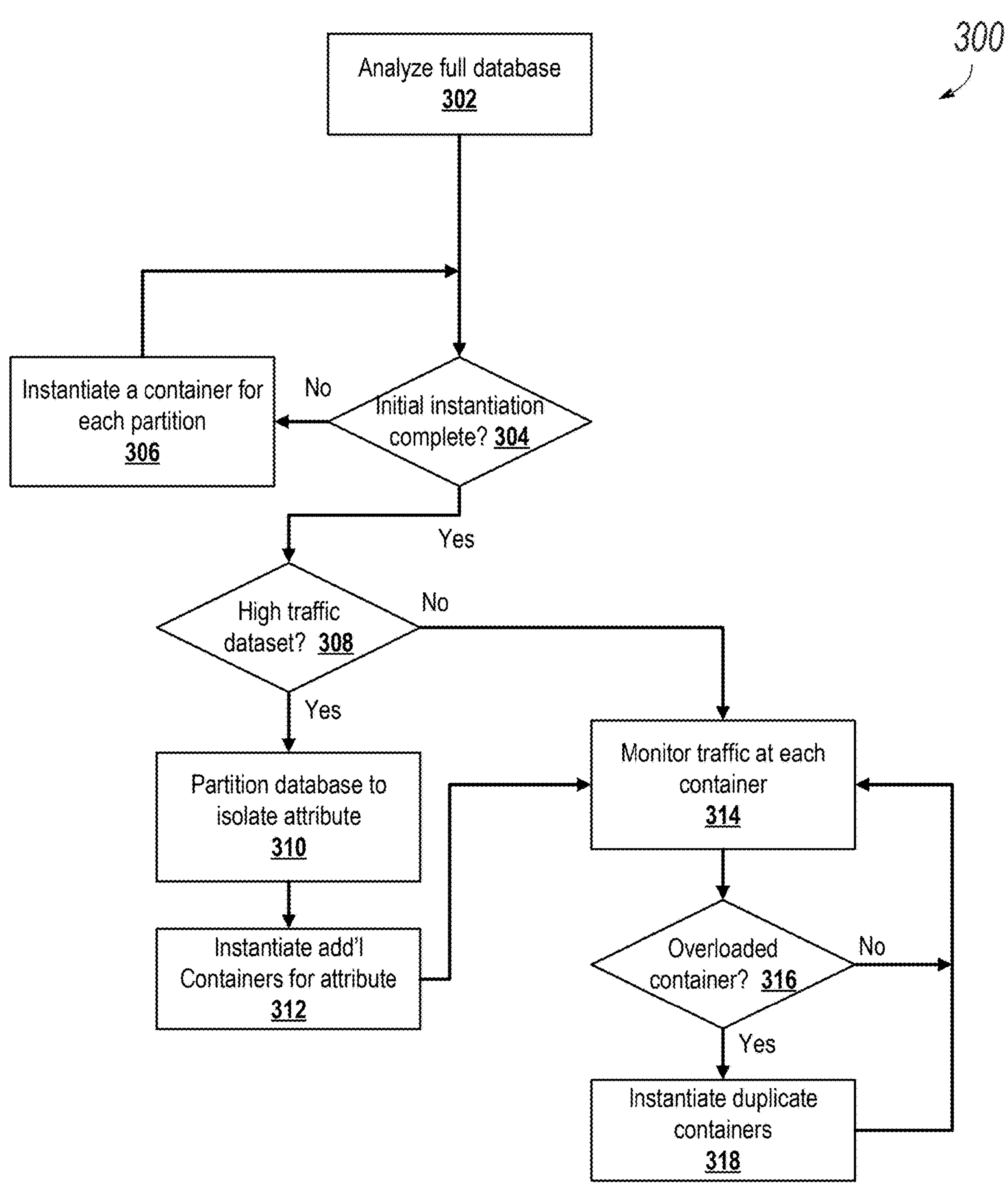
FIG. 3 is a flowchart of an example process 300 for generating a flexibly scalable database with native internationalization.

FIG. 3 is a flowchart of an example process 300 for generating a flexibly scalable database with native internationalization. It will be understood that process 200 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute process 300. In some implementations, the process 300 and related methods are executed by one or more components of the system 100 described above with respect to FIG. 1, such as the partitioning engine 118 and the load balancing engine 120, and/or portions thereof.

At 302, the database to be partitioned is analyzed. In some implementations, this includes a database with duplicative data in multiple languages, as well as unstructured data, and/or data that is associated with particular locations (e.g., includes latitude and/or longitude fields).

At 304, if the database partitions are not each assigned to an instantiated container, then process 300 continues to 306. Otherwise, process 300 can bypass 306 and proceed to 308.

At 306, a container for each partition (e.g., by language or regional preference) is instantiated. These containers can then load the portion of the full database corresponding to the particular region or language.

At 308, datasets within the database can be analyzed to identify high traffic attributes or objects that may require greater resources than another. These high traffic datasets or objects, at 310, can be partitioned further into separate datasets such that they can be loaded into their own instance of the in-memory database. This provides advantageous scaling properties, because as the high-traffic datasets are scaled up, only the necessary data is stored in-memory, and not duplicative, low-traffic datasets. In some implementations, the fine tuning of which datasets to be partitioned is performed using a horizontal pod autoscaling functionality, which monitors memory or CPU usage of various containers in a containerized computing environment and selects high usage ones to scale. In some instances, high-traffic datasets are identified based on previous usage data, or database heuristics. In some instances, high-traffic datasets can be identified during operation, as query statistics are collected over time. At 312, additional containers for the high-traffic dataset are instantiated and can be loaded with the newly partitioned high-traffic datasets. By isolating the high-traffic data and separating it into a distinct container, it can be scaled up independently of the remainder of the database, reducing the need to duplicate unnecessary data and reducing the operational cost of maintaining an in-memory database.

At 314, the overall traffic and query load can be monitored and assessed as the in-memory databases are queried. In some implementations number of queries, response time, re-query amount, or other information is recorded and used to determine an overall performance for each container and each dataset. The information can be used to determine, or update, determinations of which datasets and associated database partitions are considered high-traffic. If significant requests and/or users are associated with a particular dataset, the resources associated with that partition can be increased. Similarly, if particular datasets are associated with less traffic than anticipated, one or more instantiated instances for that dataset can be removed, as fewer resources are needed. Ongoing analysis and monitoring can be used throughout the life of the datasets, allowing for dynamic modifications to the partitions of the database during actual operations, allowing for ebbs and flows to be handled accordingly.

At 316, an analysis is performed to identify if there are any overloaded containers or underperforming containers. If a container is overloaded, additional duplicate containers can be instantiated at 318. These duplicate containers can divide traffic between them, reducing the load on any one individual container and improving overall system performance. If a container is underperforming, or underutilized, it can be shut down, or merged with another underperforming container to conserve computing resources. Process 300 can return to 314 where continued monitoring occurs. In some implementations, process 300 can periodically, or continuously return to 302, and re-perform the entire analysis. Alternatively, the initial analysis and setup of the dataset may occur from 302 to 312. Once the dataset is made available, process 300 can continue at 314-318, updating the resources provided between the partitions based on ongoing interactions and system requirements.

Figure 4:
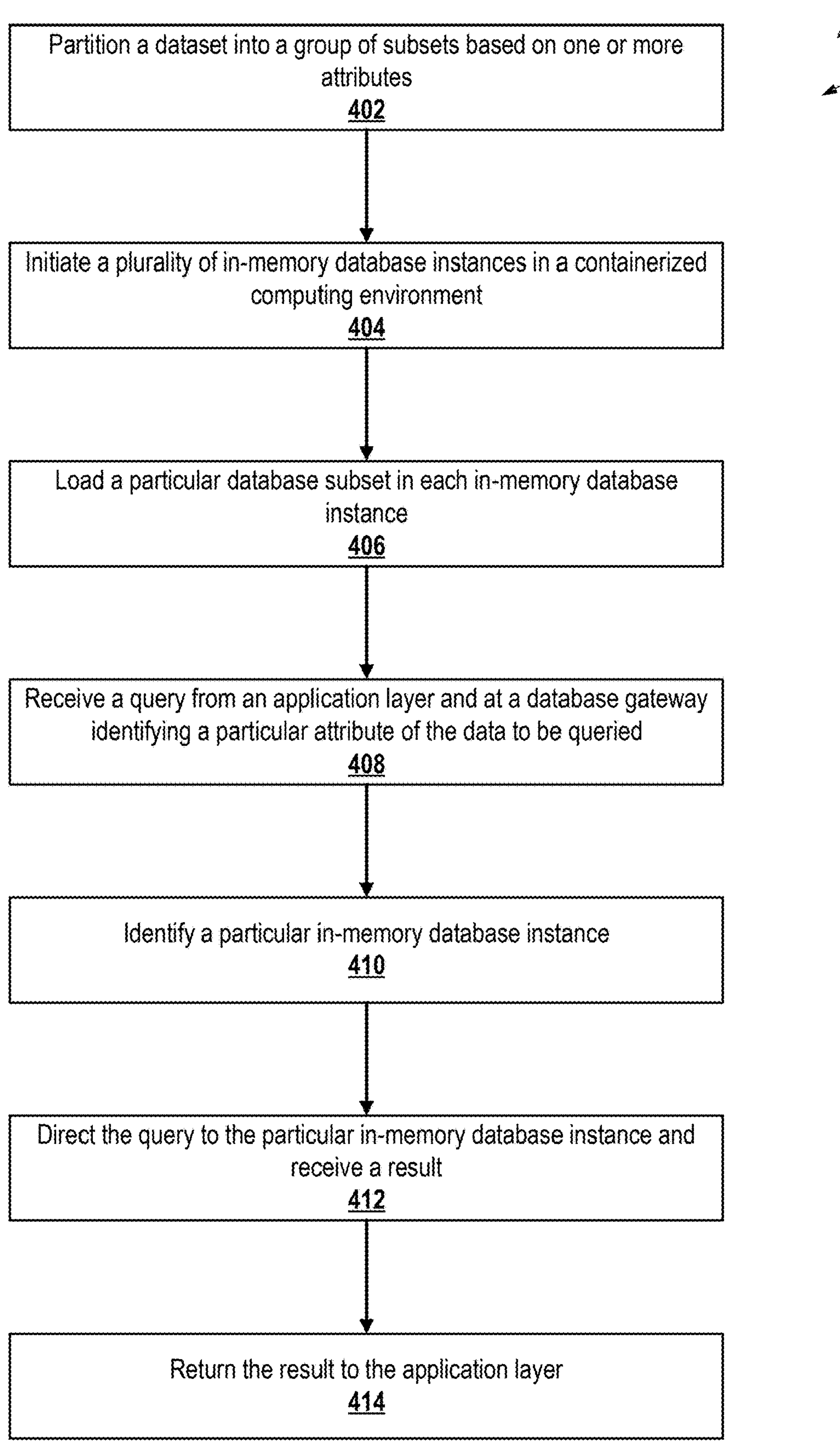
FIG. 4 is a flowchart of an example process 400 for querying a flexibly scalable database with native internationalization.

FIG. 4 is a flowchart of an example process 400 for querying a flexibly scalable database with native internationalization. It will be understood that process 400 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute process 400. In some implementations, the process 400 and related methods are executed by one or more components of the system 100 described above with respect to FIG. 1, such as the scaling database system 102, and/or portions thereof.

At 402, a dataset is partitioned into a group of subsets based on one or more attributes. The dataset can be a database that is to be replicated in a scalable database system using in-memory data storage and can include large quantities of data to be made available to large numbers of users globally. The dataset can be partitioned using attributes of the data, which can include language, geographic region, data category, data type, or other features of the data.

At 404, a plurality of in-memory database instances are initiated in a containerized computing environment. The in-memory database instances can be used for their advantages in read and write speeds. In some implementations, the in-memory databases are SAP HANA databases. By instantiating the databases in a containerized environment, adding additional instances and removing or reallocating instances can be efficiently performed during operation. In some implementations, the containerized computing environment is a Kubernetes environment.

At 406, each in-memory database loads a particular database subset from the partitioned database. Because each in-memory database can be readily duplicated or shut down to satisfy varying demand, individual database subsets can be allocated among the available compute resources accordingly. In this manner, the various subsets are independently scalable from the remaining entirety of the database.

At 408, an application layer can send a query to a database gateway, the query identifying a particular attribute of the data to be queried. In some implementations, the query can identify a particular language or region. In some implementations, the query can identify other attributes such as file type, size, document title, strings contained within a document, etc.

At 410, a particular in-memory database is identified. The particular in-memory database can be that database that stores data associated with the attribute in the query. For example, the English database may be identified when the query identifies an English language attribute, or where the user associated with the query request is from a predominantly English-speaking location. In some implementations, the gateway selects the appropriate in-memory database.

At 412, the query is directed to and executed against the particular in-memory database, where a search is performed on the query and a result is returned.

At 414, the database gateway can return the result to the application layer, which in turn can provide the result, for example using a GUI, to a user.

Figure 5:
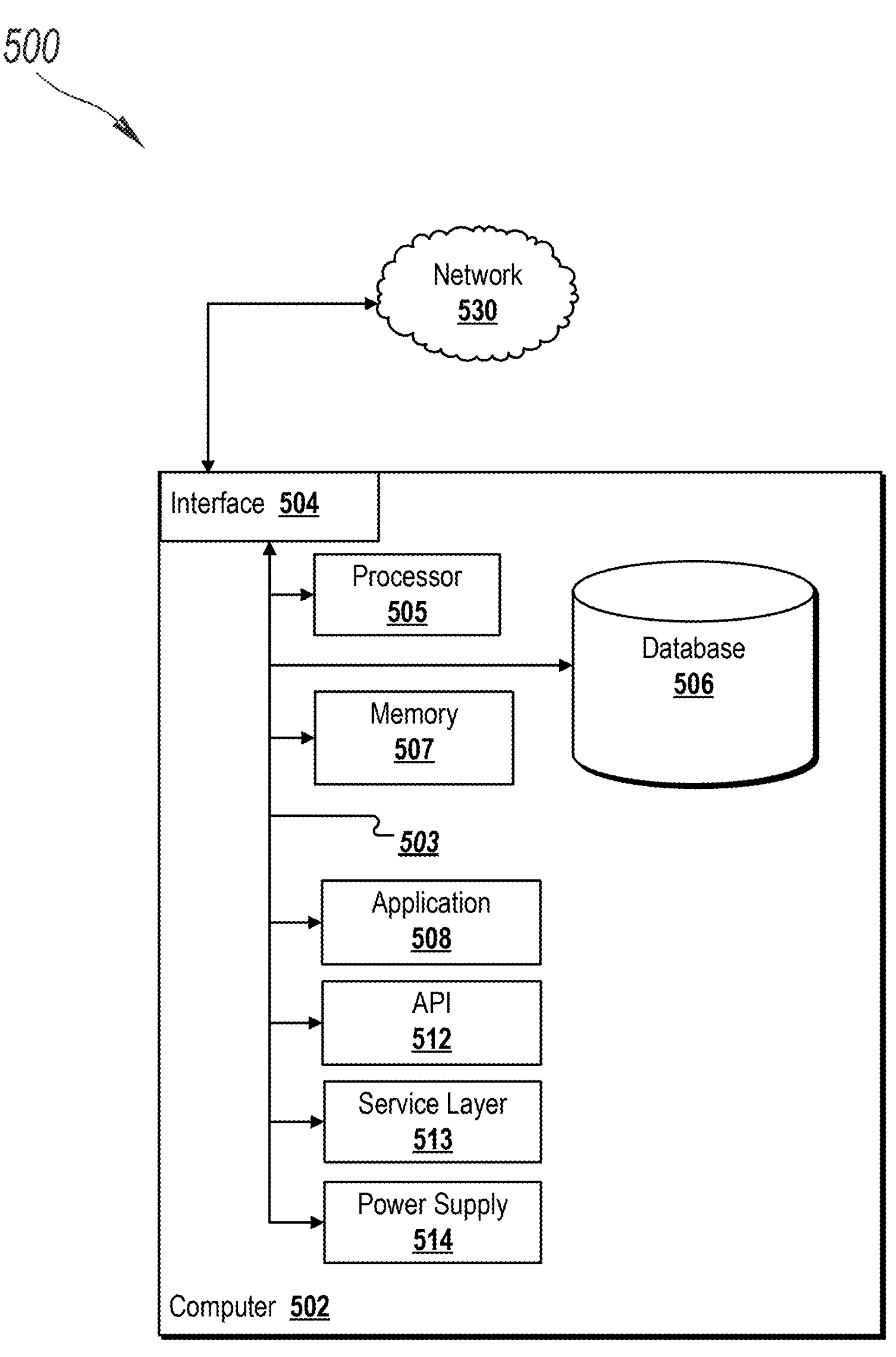
FIG. 5 is a block diagram illustrating an example of a computer-implemented system.

FIG. 5 is a block diagram illustrating an example of a computer-implemented system. 500 used to provide computational functionalities associated with described algorithms, methods, functions, processes, flows, and procedures, according to an implementation of the present disclosure. In the illustrated implementation, system 500 includes a computer 502 and a network 530.

The illustrated computer 502 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the computer 502 can include an input device, such as a keypad, keyboard, or touch screen, or a combination of input devices that can accept user information, and an output device that conveys information associated with the operation of the computer 502, including digital data, visual, audio, another type of information, or a combination of types of information, on a graphical-type user interface (UI) (or GUI) or other UI.

The computer 502 can serve in a role in a distributed computing system as, for example, a client, network component, a server, or a database or another persistency, or a combination of roles for performing the subject matter described in the present disclosure. The illustrated computer 502 is communicably coupled with a network 530. In some implementations, one or more components of the computer 502 can be configured to operate within an environment, or a combination of environments, including cloud-computing, local, or global.

At a high level, the computer 502 is an electronic computing device operable to receive, transmit, process, store, or manage data and information associated with the described subject matter. According to some implementations, the computer 502 can also include or be communicably coupled with a server, such as an application server, e-mail server, web server, caching server, or streaming data server, or a combination of servers.

The computer 502 can receive requests over network 530 (for example, from a client software application executing on another computer 502) and respond to the received requests by processing the received requests using a software application or a combination of software applications. In addition, requests can also be sent to the computer 502 from internal users (for example, from a command console or by another internal access method), external or third-parties, or other entities, individuals, systems, or computers.

Each of the components of the computer 502 can communicate using a system bus 503. In some implementations, any or all of the components of the computer 502, including hardware, software, or a combination of hardware and software, can interface over the system bus 503 using an application programming interface (API) 512, a service layer 513, or a combination of the API 512 and service layer 513. The API 512 can include specifications for routines, data structures, and object classes. The API 512 can be either computer-language independent or dependent and refer to a complete interface, a single function, or even a set of APIs. The service layer 513 provides software services to the computer 502 or other components (whether illustrated or not) that are communicably coupled to the computer 502. The functionality of the computer 502 can be accessible for all service consumers using the service layer 513. Software services, such as those provided by the service layer 513, provide reusable, defined functionalities through a defined interface. For example, the interface can be software written in a computing language (for example, JAVA or C++) or a combination of computing languages and providing data in a particular format (for example, extensible markup language (XML)) or a combination of formats. While illustrated as an integrated component of the computer 502, alternative implementations can illustrate the API 512 or the service layer 513 as stand-alone components in relation to other components of the computer 502 or other components (whether illustrated or not) that are communicably coupled to the computer 502. Moreover, any or all parts of the API 512 or the service layer 513 can be implemented as a child or a sub-module of another software module, enterprise application, or hardware module without departing from the scope of the present disclosure.

The computer 502 includes an interface 504. Although illustrated as a single interface 504, two or more interfaces 504 can be used according to particular needs, desires, or particular implementations of the computer 502. The interface 504 is used by the computer 502 for communicating with another computing system (whether illustrated or not) that is communicatively linked to the network 530 in a distributed environment. Generally, the interface 504 is operable to communicate with the network 530 and includes logic encoded in software, hardware, or a combination of software and hardware. More specifically, the interface 504 can include software supporting one or more communication protocols associated with communications such that the network 530 or hardware of interface 504 is operable to communicate physical signals within and outside of the illustrated computer 502.

The computer 502 includes a processor 505. Although illustrated as a single processor 505, two or more processors 505 can be used according to particular needs, desires, or particular implementations of the computer 502. Generally, the processor 505 executes instructions and manipulates data to perform the operations of the computer 502 and any algorithms, methods, functions, processes, flows, and procedures as described in the present disclosure.

The computer 502 also includes a database 506 that can hold data for the computer 502, another component communicatively linked to the network 530 (whether illustrated or not), or a combination of the computer 502 and another component. For example, database 506 can be an in-memory or conventional database storing data consistent with the present disclosure. In some implementations, database 506 can be a combination of two or more different database types (for example, a hybrid in-memory and conventional database) according to particular needs, desires, or particular implementations of the computer 502 and the described functionality. Although illustrated as a single database 506, two or more databases of similar or differing types can be used according to particular needs, desires, or particular implementations of the computer 502 and the described functionality. While database 506 is illustrated as an integral component of the computer 502, in alternative implementations, database 506 can be external to the computer 502. The database 506 can hold any data type necessary for the described solution.

The computer 502 also includes a memory 507 that can hold data for the computer 502, another component or components communicatively linked to the network 530 (whether illustrated or not), or a combination of the computer 502 and another component. Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507, two or more memories 507 or similar or differing types can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in the present disclosure. For example, application 508 can serve as one or more components, modules, or applications. Further, although illustrated as a single application 508, the application 508 can be implemented as multiple applications 508 on the computer 502. In addition, although illustrated as integral to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion or management circuits (including recharging, standby, or another power management functionality). In some implementations, the power supply 514 can include a power plug to allow the computer 502 to be plugged into a wall socket or another power source to, for example, power the computer 502 or recharge a rechargeable battery.

There can be any number of computers 502 associated with, or external to, a computer system containing computer 502, each computer 502 communicating over network 530. Further, the term "client," "user," or other appropriate terminology can be used interchangeably, as appropriate, without departing from the scope of the present disclosure. Moreover, the present disclosure contemplates that many users can use one computer 502, or that one user can use multiple computers 502.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

The invention claimed is:

1. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

partitioning a dataset into a group of subsets based on one or more attributes;

initiating a plurality of in-memory database instances in a containerized computing environment, wherein there is at least one in-memory database instance in the plurality of in-memory database instances for each database subset of the group of subsets;

loading, by a particular in-memory database instance, a particular database subset;

receiving a query at a database gateway from an application layer, wherein the query identifies a particular attribute of data to be queried;

identifying, by the database gateway, the particular database subset based on the particular attribute of the data to be queried;

directing, by the database gateway, the query to the particular in-memory database instance by reformatting the query as a request directed to the particular in-memory database instance, and receiving a result; and returning the result to the application layer.

2. The system of claim 1, wherein the database gateway identifies the particular database subset based on at least one of: a URL from which the query was received, or the particular attribute identified within the query.

3. The system of claim 1, wherein the one or more attributes comprise a language of the database subset.

4. The system of claim 1, wherein the database gateway receives the query from the application layer and returns the result to the application layer using an API.

5. The system of claim 1, the operations comprising:

identifying an increased demand for the particular database subset; and in response to identifying the increased demand, instantiating at least one additional in-memory database instance to load a copy of the particular database subset.

6. The system of claim 1, wherein the plurality of in-memory database instances are loaded with the group of subsets of the dataset such that the entire dataset is loaded in in-memory database instances.

7. The system of claim 6, wherein the plurality of in-memory database instances are allocated among the group of subsets according to an expected service demand.

8. A non-transitory, computer-readable medium storing one or more instructions executable by a computer system to perform operations comprising:

partitioning a dataset into a group of subsets based on one or more attributes;

initiating a plurality of in-memory database instances in a containerized computing environment, wherein there is at least one in-memory database instance in the plurality of in-memory database instances for each database subset of the group of subsets;

loading, by a particular in-memory database instance, a particular database subset;

receiving a query at a database gateway from an application layer, wherein the query identifies a particular attribute of data to be queried;

identifying, by the database gateway, the particular database subset based on the particular attribute of the data to be queried;

directing, by the database gateway, the query to the particular in-memory database instance by reformatting the query as a request directed to the particular in-memory database instance, and receiving a result; and returning the result to the application layer.

9. The medium of claim 8, wherein the database gateway identifies the particular database subset based on at least one of: a URL from which the query was received, or the particular attribute identified within the query.

10. The medium of claim 8, wherein the one or more attributes comprise a language of the database subset.

11. The medium of claim 8, wherein the database gateway receives the query from the application layer and returns the result to the application layer using an API.

12. The medium of claim 8, the operations comprising:

identifying an increased demand for the particular database subset; and in response to identifying the increased demand, instantiating at least one additional in-memory database instance to load a copy of the particular database subset.

13. The medium of claim 8, wherein the plurality of in-memory database instances are loaded with the group of subsets of the dataset such that the entire dataset is loaded in in-memory database instances.

14. The medium of claim 13, wherein the plurality of in-memory database instances are allocated among the group of subsets according to an expected service demand.

15. A computer-implemented method, comprising:

partitioning a dataset into a group of subsets based on one or more attributes;

initiating a plurality of in-memory database instances in a containerized computing environment, wherein there is at least one in-memory database instance in the plurality of in-memory database instances for each database subset of the group of subsets;

loading, by a particular in-memory database instance, a particular database subset;

receiving a query at a database gateway from an application layer, wherein the query identifies a particular attribute of data to be queried;

identifying, by the database gateway, the particular database subset based on the particular attribute of the data to be queried;

directing, by the database gateway, the query to the particular in-memory database instance by reformatting the query as a request directed to the particular in-memory database instance, and receiving a result; and returning the result to the application layer.

16. The method of claim 15, wherein the database gateway identifies the particular database subset based on at least one of: a URL from which the query was received, or the particular attribute identified within the query.

17. The method of claim 16, wherein the one or more attributes comprise a language of the data within the database subset.

18. The method of claim 15, wherein the database gateway receives the query from the application layer and returns the result to the application layer using an API.

19. The method of claim 15, comprising:

identifying an increased demand for the particular database subset; and in response to identifying the increased demand, instantiating at least one additional in-memory database instance to load a copy of the particular database subset.

20. The method of claim 15, wherein the plurality of in-memory database instances are loaded with the group of subsets of the dataset such that the entire dataset is loaded in in-memory database instances.

* * * * *